United States Patent [19]
Helms

[11] Patent Number: 4,499,790
[45] Date of Patent: Feb. 19, 1985

[54] SWIVEL HEAD FOR INDUSTRIAL ROBOTS
[75] Inventor: Dirk Helms, Ahrensburg, Fed. Rep. of Germany
[73] Assignee: Fa.Jungheinrich Unternehmensverwaltung KG, Hamburg, Fed. Rep. of Germany
[21] Appl. No.: 396,035
[22] Filed: Jul. 7, 1982
[30] Foreign Application Priority Data
May 22, 1982 [DE] Fed. Rep. of Germany ....... 3219292
[51] Int. Cl.³ .................. F16H 37/06; F16H 1/14; G05G 11/00; B25H 9/00
[52] U.S. Cl. .................. 74/665 C; 74/417; 74/479; 414/735; 414/4; 901/26; 901/29
[58] Field of Search ............ 74/665 A, 665 B, 665 C, 74/665 D, 665 E, 665 R, 665 L, 665 M, 665 N, 665 P, 675, 674, 661, 385, 469, 417, 785, 789, 479; 414/735, 732, 4; 901/29, 26, 36, 37, 38

[56] References Cited
U.S. PATENT DOCUMENTS

| 3,315,545 | 4/1967 | Schnoebelen | 74/789 |
|---|---|---|---|
| 3,739,923 | 6/1973 | Totsuka | 414/730 X |
| 3,784,031 | 1/1974 | Niitu et al. | 414/735 |
| 3,817,403 | 6/1974 | Glachet et al. | 414/735 |
| 3,971,266 | 7/1976 | Inakura | 74/675 |
| 4,068,763 | 1/1978 | Fletcher et al. | 414/4 |
| 4,076,131 | 2/1978 | Dahlstrom et al. | 414/735 X |
| 4,384,498 | 5/1983 | Eichinger | 74/785 |

FOREIGN PATENT DOCUMENTS

| 2402829 | 8/1974 | Fed. Rep. of Germany . | |
| 2226407 | 9/1975 | Fed. Rep. of Germany . | |
| 2619336 | 11/1976 | Fed. Rep. of Germany | 414/4 |
| 2045720 | 11/1980 | United Kingdom | 414/735 |

Primary Examiner—Allan D. Herrmann
Assistant Examiner—Stephen B. Andrews
Attorney, Agent, or Firm—Toren, McGeady and Stanger

[57] ABSTRACT

A swivel head for industrial robots has two degrees of freedom, which are associated with respective spindles having intersecting axes. A first spindle serves to swivel a tool and a second spindle serves to rotate the tool. The swivel head also comprises two concentric drive shafts, which extend one in the other and carry bevel gears. One of said bevel wheels is a driving bevel gear for directly driving the second spindle by means of a bevel gear mounted on said second spindle. The other bevel gear drives a swiveling bevel gear mounted on the first spindle. In that swivel head a speed-reducing tansmission having a high reduction ratio is connected to the second spindle and serves to drive a tool carrier. The swiveling bevel gear directly carries a bearing bracket, which carries the tool shaft and intermediate gears of the transmission. The housing of the swivel head consists of a rigid part and a movable part.

22 Claims, 5 Drawing Figures

SWIVEL HEAD FOR INDUSTRIAL ROBOTS

SUMMARY OF THE INVENTION

This invention relates to a swivel head for industrial robots, which swivel head has two degrees of freedom and comprises two intersecting spindles, each of which is associated with one of said degrees of freedom and which comprises a first spindle for swiveling a tool and a second spindle for rotating the tool, two concentric drive shafts, which extend one in the other, and bevel gears mounted on said drive shafts and comprising a driving bevel gear for rotating the second spindle by means of a bevel gear mounted on said second spindle, and a second bevel gear for driving a swiveling bevel gear mounted on the first spindle.

Such a design, in which one bevel gear is used for a direct swivel drive and another bevel gear serves to directly rotate the second spindle, affords substantial advantages because the swivel head can be light in weight and compact and can be provided with inexpensive transmitting means. Besides, the kinematic system is simple and comprises only a few gears and the precision is higher than in known designs calling for numerous intermediate gears.

These advantages are particularly afforded in comparison with a swivel head which has been disclosed in German Patent Publication No. 26 19 336 and has two or three degrees of freedom and comprises coaxial shafts, which are associated with respective degrees of freedom and extend one in the other and carry bevel gears. In the illustrated embodiment having only two degrees of freedom, the tool cannot be rotated on its center line and such rotation can be imparted only to the tool carrier. Known designs call for a complicated housing structure, particularly for an expensive housing, which carries the second spindle and must be pivoted to another housing, which carries the first spindle. Such nested housings require a high expenditure of material and involve relatively large dimensions and protruding transmitting elements and the resulting backlash in bearings and between interengaging parts reduces the accuracy. Besides, a certain inertia must be overcome in controlling the swivel head.

If the tool is mounted on the tool carrier for rotation about its center line, which is defined by the second spindle, a transmission for transmitting the drive is mounted in the known swivel head just described on a side wall of the pivoted housing and comprises a gear set which is rotatably mounted on the first spindle and a spur gear train including a gear that is mounted in the pivoted housing and used to drive via a bevel gear the bevel gear mounted on the second spindle. This arrangement requires numerous bearings for spindles or spindlelike members. For instance, a bevel gear in mesh with a bevel gear on the second spindle is mounted on a separate spindle, which is parallel to the first spindle and mounted in the pivoted housing.

That known assembly has not only the disadvantages stated above but owing to the transmitting means employed is relatively large so that the field of application of the swivel head is restricted and the swivel head cannot always be used to reach all portions of a workpiece, particularly its corners, unless expensive extensions are provided.

More or less expensive transmissions having concentric drive shafts which extend one in the other as well as spur gear trains and bevel gear trains are known from German Patent Specification No. 2,226,407 and German Patent Publication No. 2,402,829. These known transmissions also involve a considerable expenditure.

It is an object of the invention to provide a swivel head, particularly one of the preferred design, which is improved in that it is relatively simple in structure and while transmitting stronger forces and operating with a higher precision applies a smaller load to the arm by which the industrial robot carries the swivel head.

This object is accomplished according to the invention in that the second spindle is connected to a speed-reducing transmission which has a high reduction ratio and serves to drive a tool carrier. This speed reduction results in a higher torque and in a higher torsional stiffness. The transmission may have a transmission ratio of 5:1 to 13:1 or more and preferably of 10:1. The torsional stiffness of the drive shaft associated with the second spindle increase virtually as the square of the transmission ratio.

Although various speed-reducing transmissions may be used, the speed-reducing transmission consists in a particularly preferred embodiment of a planetary gear train, which comprises a sun pinion that is provided at the end of the second spindle and in mesh with planet pinions, which are carried by at least one attachment of a tool carrier shaft, which is coaxial to the second spindle and mounted on the swiveling bevel wheel. The use of a planetary gear train affords the advantage that it is coaxial to the second spindle so that it will not give rise to deflecting loads or reaction torques and nevertheless a high reduction ratio is obtained and the mounting of the tool carrier shaft is improved. Although the planetary gear train may include a plurality of stages, it has only a single stage in a preferred embodiment.

An advantage afforded by the above-mentioned design comprising a direct swiveling drive including a bevel gear and a direct rotation of the second spindle by another bevel gear and the first spindle resides in that the bearing bracket can be used to carry the tool shaft and the planet pinions. In that case the compact design and particularly the light weight of the swivel head will be retained. Owing to the concentric arrangement the bearing bracket is not subjected to undesired loads.

The bearing bracket preferably comprises a plate, which concentrically surrounds the second spindle and on which a housinglike bearing carrier for the tool carrier shaft is mounted and is provided with a bearing for the tool carrier shaft. In that connection the term bearing includes a bearing for rotatably mounting the shaft and for holding it against axial movement; this applies also to the bearings for the first and second spindles.

The swivel head comprises a housing, in which the first spindle is rotatably mounted. That housing preferably accommodates the transmitting means for swiveling the tool and for driving the second spindle and the bearings therefore and consists of a rigid part and movable part. As a result, the structure is much simpler and lighter in weight than the known swivel heads having nested housings. The stationary or rigid part of that housing preferably does not extend substantially beyond the bearings for the first spindle and a bellows extends from the plate to the housing at a point between the bearings for the first spindle and that end of the housing where the drive shafts enter the housing. As a result, the swivel head is protected by a single housing so that weight is saved even though an additional speed-reducing transmission is provided, which will be particularly light in weight if it consists of a planetary gear train, as is preferred.

The attachment of the tool carrier shaft suitably consists of a star-shaped member or a flange and carries three bearings for three planet pinions, which are in mesh with the sun pinion provided at the end of the second spindle. In that case the sun pinion may be small in diameter so that desirable reduction ratios and a high stability can be achieved.

BRIEF DESCRIPTION OF THE INVENTION

The invention will now be explained with reference to illustrative embodiments which are shown on the drawing, in which FIG. 1 is a diagrammatic sectional view showing a swivel head, FIG. 2 is a sectional view taken on line II—II in FIG. 1, FIG. 3 is a fragmentary sectional view showing another embodiment, FIG. 4 is a diagrammatic side elevation showing an industrial robot provided with a swivel head according to the invention, and FIG. 5 is a sectional view showing a swivel head which is similar to that of FIG. 1 but comprises a different tool carrier.

DETAILED DESCRIPTION OF THE INVENTION

Figure 1:
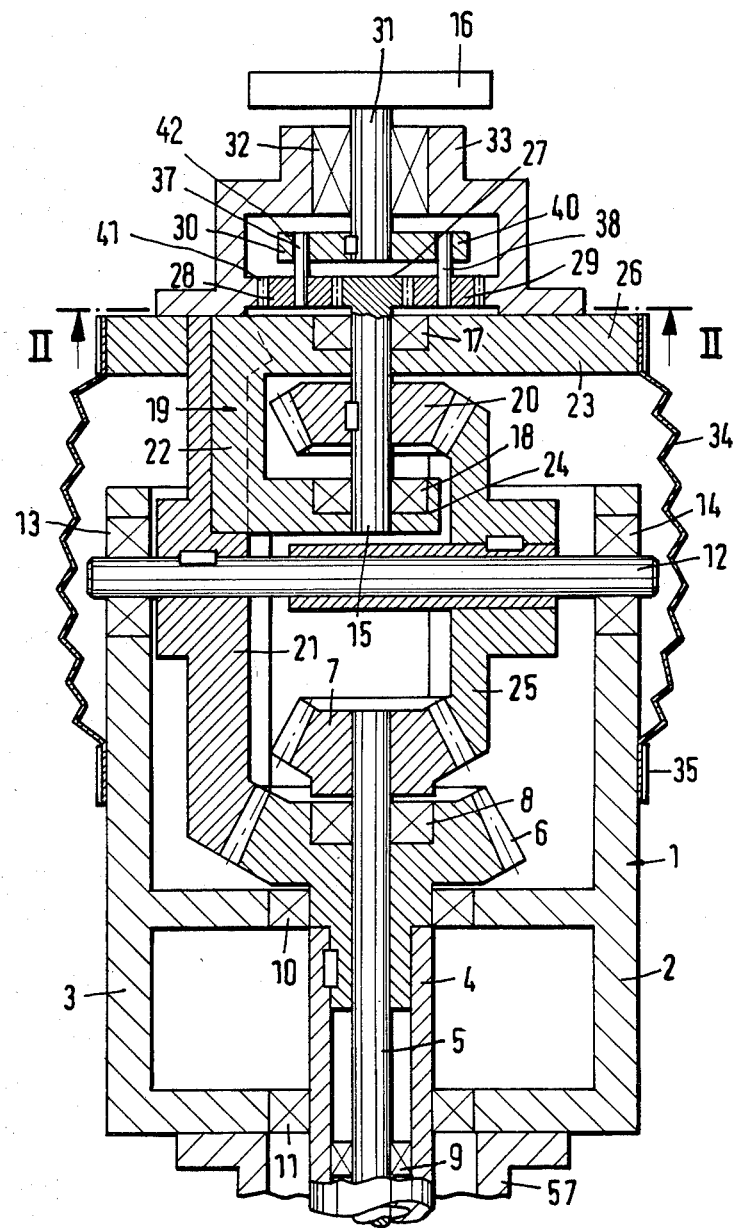

A swivel head 1 having side walls 2, 3 is mounted on an arm of an industrial robot. That arm is not shown in FIGS. 1 to 3. Two concentric shafts 4, 5, extend one in the other from said arm into the swivel head and carry respective bevel gears 6, 7, which are concentric to each other and disposed in the housing of the swivel head 1. The bevel gear 7 mounted on the inner shaft 5 is disposed over the bevel gear 6 mounted on the hollow outer shaft 4. The shafts are mounted one in the other by bearing means 8, 9 and the outer shaft 4 is rotatably mounted in bearings 10, 11 of the swivel head. The swivel head may be mounted in a conventional manner on the arm of the industrial robot.

The side walls 2, 3 of the swivel head are provided with bearings 13, 14, in which a first spindle 12 is freely rotatably mounted so that the swivel head constitutes a bearing bracket. The first spindle carries a second spindle 15, which extends in the swivel head 1 radially of and at right angles to the first spindle 12 so that the axis of the second spindle always intersects the axis of the first spindle. The second spindle 15 is mounted in bearings 17, 18 of a bearing bracket 19. A bevel gear 20 is non-rotatably connected to the second spindle 15 within the bearing bracket 19 and can be driven to rotate the second spindle 15.

A swiveling bevel gear 21 is non-rotatably connected to the first spindle 12 near the side wall 3 and is in mesh with the bevel gear 6 on the drive shaft 4. The swiveling bevel wheel 21 carries the bearing bracket 19, which has a web 22, which extends radially of the swiveling bevel gear 21 and is secured to the latter. Parallel arms 23, 24 extend from said web 22 and are provided with the bearings 17, 18 for the second spindle 15. The bevel gears 7 and 20 are operatively interconnected by the driving bevel wheel 25, which is concentric to the swiveling bevel gear 21 and freely rotatably mounted on the first spindle 12.

Because the two bevel gears, namely, the swiveling bevel gear 21 and the driving bevel gear 25, are concentric, the swiveling bevel gear 21 can directly carry the second spindle 15 within a short swivel head 1 and only one gear, consisting of the driving bevel wheel 25, is required to operatively connect the two bevel wheels 7 and 20.

The housing of the swivel head 1 comprises the side walls 2, 3 and extends from the drive shafts 4, 5 only slightly beyond the bearings 13, 14 for the first spindle 12, which is held in said bearings against axial displacement. The arm 23 of the bearing bracket 19 is parallel to the arm 24 and consists of a plate 26, which surrounds the second spindle 15, the axis of which is defined by the bearings 17, 18. The end portion of the second spindle 15 constitutes a sun pinion 27, which is in mesh with three planet pinions, only two of which, numbered 28, 29, are shown in FIG. 1. The planet pinions are mounted in bearings 40, 42 on a flangelike attachment 30 mounted on a tool carrier shaft 31. A tool carrier 16 is diagrammatically indicated and is non-rotatably connected to the tool carrier shaft 31. The latter is rotatably and axially immovably mounted in a bearing 32, which is carried by a housinglike bearing carrier 33, which is secured to and pivotally movable with the plate 26. The bearing carrier 33 is provided with an internal ring gear 41 in mesh with the planet pinions 28, 29.

An improvement resides in the short length of the housing which comprises the side walls 2, 3. On the other hand, protection is provided by a flexible covering, which permits the swiveling movement. For this purpose, a bellows 34 is provided, which is secured at one end to the outside periphery of the plate 26 and at the other end to a portion 35 of the side walls 2, 3 of the housing of the swivel head 1. The portion 35 is disposed between the bearings 13, 14 for the first spindle 12 and the portion provided with the bearing 11 for the drive shaft 4.

Figure 2:
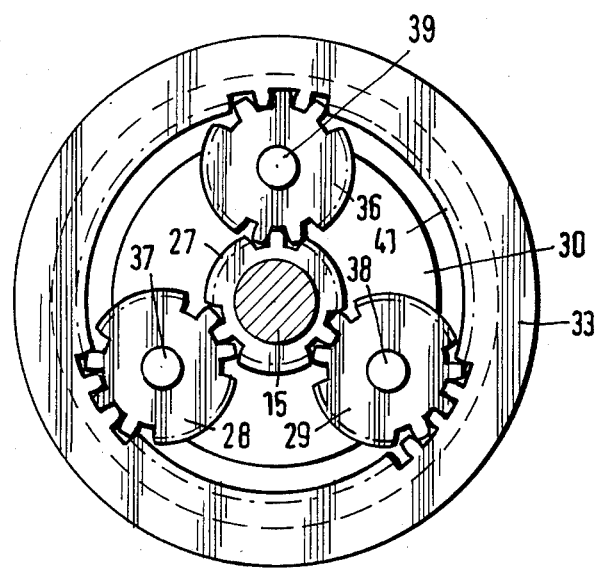

It is apparent from FIG. 2 that the flangelike attachment 30 carries the two planet pinions 28, 29 as well as a third planet pinion 36, which also meshes with the sun pinion 27. The latter has been formed in the second spindle so that its cross-section is minimized. It is also shown in FIG. 2 that the shafts 37, 38, 39 of the planet pinions 28, 29, 36 are rotatably mounted in bearings 40, 42 of the attachment 30 but are axially immovably secured so that a rotation of the sun pinion 27 will be transmitted to the attachment 30 with a reduction ratio which is determined by the sun pinion 27 and by the planet pinions 28, 29, 36. The internal ring gear 41 on the bearing carrier 33 is also apparent.

Figure 3:
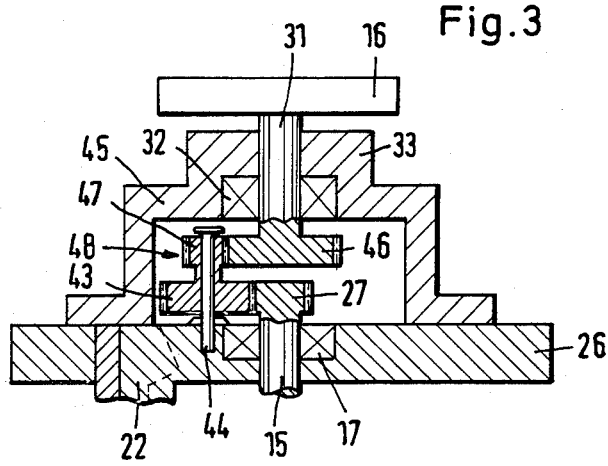

FIG. 3 is a sectional view showing the top portion of a swivel head which is similar to that of FIG. 1 but has different transmitting means mounted on the second spindle 15. The second spindle 15, its bearing 17 and the plate 26 which constitutes one of two parallel arms of the bearing bracket 19 are apparent. A pinion 27 is provided on the second spindle 15 and in mesh with a gear 43, which is mounted on an intermediate shaft 44, which is freely rotatably mounted at one end in the plate 26.

The bearing 32 for the tool carrier shaft 31 is provided in a forward end wall 45 and is concentric to the second spindle 15. The gear 46 is mounted on the inner end of the tool carrier shaft 31 and in mesh with a pinion 47, which is non-rotatably connected to the intermediate shaft 44. The latter is rotatably mounted and axially fixed, also the second spindle and the tool carrier shaft.

This spur gear train generally designated 48 can also provide a high reduction ratio.

FIG. 3 is only diagrammatic. In fact the pinions 27 and 47 are much smaller in diameter than the gears 43 and 46.

Figure 4:
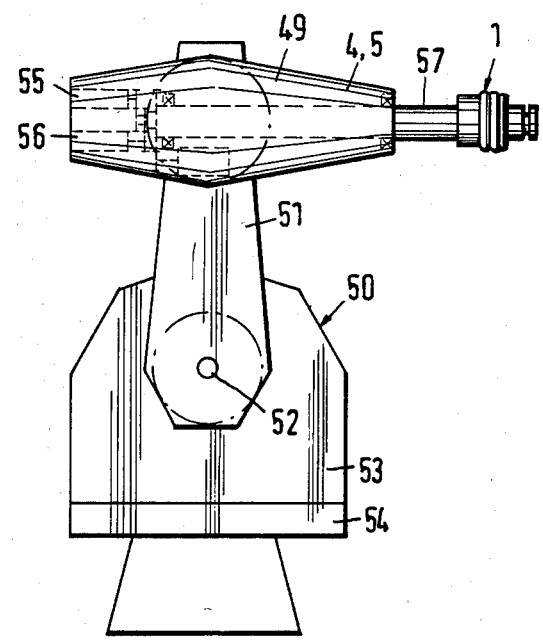

FIG. 4 is a diagrammatic side elevation showing an industrial robot. It is apparent that the shafts 4, 5 which extend into the swivel head 1 are surrounded by a tube 57, to which the swivel head is secured. The shafts 4, 5 and the tube 57 are parts of a double-armed lever 49 of an industrial robot 50. That lever 49 is similar to a lower arm and is pivoted to a lever 51, which is similar to an upper arm and is pivoted by a pin 52 to a carrier 53 of the industrial robot. The carrier 53 is mounted on a baseplate 54, which may be wheeled or may be rotatably mounted on a foundation. The parts are provided with drive motors for imparting motion. Specifically, two drive motors 55, 56 for the shafts 4, 5 are accommodated in the lever 49, which resembles a lower arm. It will be understood that a third drive motor may be provided, by which the tube that surrounds the shafts and carries the swivel head can be rotated about its own axis in order to rotate the swivel head.

Figure 5:
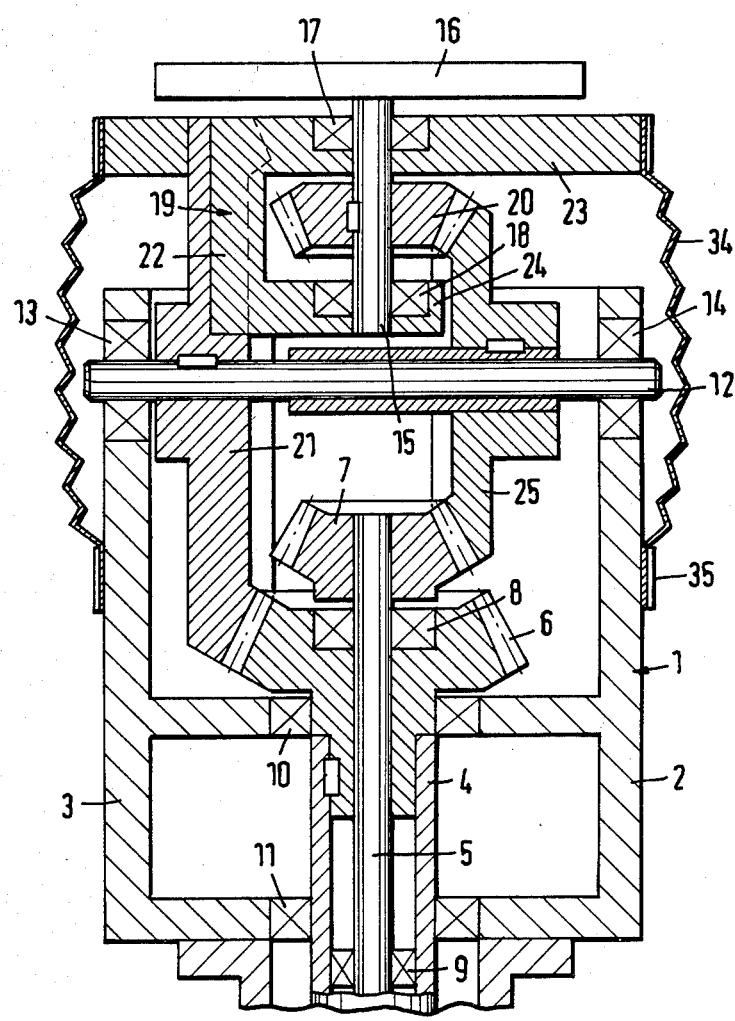

FIG. 5 is a view that is similar to FIG. 1 and shows a swivel head 1 which has a rigid housing 2, 3 and a movable, particularly flexible housing consisting of the bellows 34 which is secured to the top of the arm 23. In the embodiment shown in FIG. 5, the tool carrier 16 is directly mounted on the second spindle 15.

What is claimed is:

1. A swivel head for industrial robots, which swivel head has two degrees of freedom, comprising
    a rigid housing having a rear end portion, a front end portion, and a side wall portion extending between said rear end portion and said front end portion,
    first bearing means mounted in said housing adjacent to said rear end portion,
    second bearing means which are mounted in said side wall portion of said housing spaced from said first bearing means closer to said front end portion and comprise spaced apart bearings centered on an axis which intersects and traverses the axis of said first bearing means at right angles thereto,
    a first shaft extending centrally into said housing through said rear end portion and rotatably mounted in said first bearing means,
    a second shaft extending into said housing through said rear end portion,
    third bearing means disposed between said first and second shafts,
    a first spindle, which is rotatably mounted in said second bearing means,
    first transmitting means operatively connecting said first shaft and said first spindle and comprising a swiveling bevel gear, which is non-rotatably connected to said first spindle, said swiveling bevel gear located at least in part within said rigid housing,
    a bearing bracket carried by said swiveling bevel gear and located spaced outwardly from the front end portion of said rigid housing,
    a second spindle, which is rotatably mounted in said bearing bracket and extends out of said front end portion of said housing,
    second transmitting means which operatively connect said second shaft to said second spindle and are operable to rotate the latter,
    a bearing carrier mounted on said bearing bracket spaced outwardly from the front end portion of said housing,
    fourth bearing means which are coaxial to said second spindle and mounted in said bearing carrier,
    a tool carrier shaft, which is rotatably mounted in said fourth bearing means, and
    a speed-reducing transmission which has a high reduction ratio and operatively connects said second spindle to said tool carrier shaft to drive the latter.

2. A swivel head as set forth in claim 1, wherein
    said first shaft consists of a hollow shaft,
    said second shaft is concentric to said first shaft,
    said first transmitting means comprise a first bevel gear, which is non-rotatably connected to said first shaft and in mesh with said swiveling bevel gear,
    said second transmitting means comprise a second bevel gear, which is non-rotatably connected to said second shaft, a driving bevel gear which is rotatably mounted on said first spindle and in mesh with said second bevel gear, and a third bevel gear, which is non-rotatably connected to said second spindle and in mesh with said driving bevel gear, and
    said bearing bracket comprises a plate, which carries said bearing carrier.

3. A swivel head as set forth in claim 1, wherein said speed-reducing transmission consists of a planetary gear train comprising
    a sun pinion non-rotatably connected to said second spindle,
    an attachment non-rotatably connected to said tool carrier shaft, and carrying planet pinion bearing,
    planet pinion shafts rotatably mounted in said planet pinion bearings and carrying planet pinions in mesh with said sun pinion, and
    an internal ring gear, which is carried by said bearing carrier and in mesh with said planet pinions.

4. A swivel head as set forth in claim 3, wherein three of said planet pinions are provided.

5. A swivel head as set forth in claim 4, wherein
    said attachment has the configuration of a flange-like member and is provided with a planet pinion bearing for rotatably mounting respective planet pinion shafts carrying said planet pinions.

6. A swivel head as set forth in claim 1, wherein said speed-reducing transmission consists of a spur gear train comprising
    an intermediate shaft rotatably mounted in said bearing carrier,
    a first pinion non-rotatably connected to said second spindle,
    a first gear non-rotatably connected to said intermediate shaft and in mesh with said first pinion,
    a second pinion non-rotatably connected to said intermediate shaft and
    a second gear non-rotatably connected to said tool carrier shaft and in mesh with said second pinion.

7. A swivel head for industrial robots, which swivel head has two degrees of freedom, comprising
    a rigid housing having a rear end portion, a front end portion, and a side wall portion extending between said rear end portion and said front end portion,
    first bearing means mounted in said housing adjacent to said rear end portion,
    second bearing means which are mounted in said side wall portion of said housing spaced from said first bearing means closer to said front end portion and comprise spaced apart bearings centered on an axis which intersects and traverses the axis of said first bearing means at right angles thereto, a first shaft extending centrally into said housing through said rear end portion and rotatably mounted in said first bearing means, a second shaft extending into said housing through said rear end portion, third bearing means disposed between said first and second shafts, a first spindle, which is rotatably mounted in said second bearing means, first transmitting means operatively connecting said first shaft and said first spindle and comprising a swiveling bevel gear, which is non-rotatably connected to said first spindle, said swiveling bevel gear located at least in part within said rigid housing, a bearing bracket carried by said swivelling bevel gear and comprising a plate which extends outside of and is spaced from the front end portion of said housing and is intersected by the axis of said first bearing means, a second spindle, which is rotatably mounted in said bearing bracket and extends out of said front end portion of said housing, second transmitting means which operatively connect the second shaft to said second spindle and are operable to rotate the latter and a flexible tubular covering, which is secured to said housing and said plate and extends outwardly from the front end portion, and said flexible tubular covering surrounds said second spindle between said housing and said plate.

8. A swivel head as set forth in claim 7, wherein said flexible tubular covering consists of a bellows.

9. A swivel head as set forth in claim 7, wherein a tool carrier is mounted directly on said second spindle.

10. A swivel head as set forth in claim 7, comprising
a bearing carrier mounted on said bearing bracket,
fourth bearing means which are coaxial to said second spindle and mounted in said bearing carrier,
a tool carrier shaft, which is rotatably mounted in said fourth bearing means, and
a speed-reducing transmission which has a high reduction ratio and operatively connects said second spindle to said tool carrier shaft to drive the latter.

11. A swivel head as set forth in claim 7, wherein
said first shaft consists of a hollow shaft,
said second shaft is concentric to and spaced radially inwardly from said first shaft,
said first transmitting means comprise a first bevel gear, which is non-rotatably connected to said first shaft and in mesh with said swiveling bevel gear, and
said second transmitting means comprise a second bevel gear, which is non-rotatably connected to said second shaft, a driving bevel gear which is rotatably mounted on said first spindle and in mesh with said second bevel gear, and a third bevel gear, which is non-rotatably connected to said second spindle and in mesh with said driving bevel gear.

12. A swivel head as set forth in claim 7, wherein
said first spindle has opposite end portions extending through said side wall portion out of said housing, and
said flexible tubular covering surrounds said end portions of said first spindle and is secured to said side wall portion between said end portions of said first spindle and said rear end portion.

13. An industrial robot comprising a pivoted arm,
first and second drive means carried by said pivoted arm, and
a swivel head having two degrees of freedom and comprising a rigid housing having a rear end portion, a front end portion, and a side wall portion extending between said rear end portion and said front end portion, first bearing means mounted in said housing adjacent to said rear end portion, second bearing means which are mounted in said side wall portion of said housing and comprise spaced apart bearings centered on an axis which intersects and traverses the axis of said first bearing means at right angles thereto and is spaced from said first bearing means in the direction toward said front end portion, a first shaft rotatably mounted in said pivoted arm and operatively connected to said first drive means and extending centrally into said housing through said rear end portion and rotatably mounted in said first bearing means, a second shaft rotatably mounted in said pivoted arm and operatively connected to said second drive means and extending into said housing through said rear end portion, third bearing means disposed between said first and second shafts, a first spindle, which is rotatably mounted in said second bearing means, first transmitting means operatively connecting said first shaft and said first spindle and comprising a swiveling bevel gear, which is non-rotatably connected to said first spindle, a bearing bracket located at least in part extending out of said front end portion and carried by said swiveling bevel gear, a second spindle, which is rotatably mounted in said bearing bracket and extends out of said housing from said front end portion, second transmitting means which operatively connect the second shaft to said second spindle and are operable to rotate the latter, a bearing carrier located outwardly from said front end portion and mounted on said bearing bracket, a fourth bearing means which are coaxial to said second spindle and mounted in said bearing carrier, a tool carrier shaft, which is rotatably mounted in said fourth bearing means, and a speed-reducing transmission which has a high reduction ratio and operatively connects said second spindle to said tool carrier shaft to drive the latter.

14. A swivel head for industrial robots, which swivel head has two degrees of freedom, comprising
a rigid housing (1,2,3) having a rear end portion, a front end portion, and a side wall portion extending between said rear end portion and said front end portion, drive shafts (4,5) supported in and extending axially through said rear end portion toward said front end portion and one being guided concentrically around the other, a rotatable first spindle (12) supported in said housing and extending perpendicularly of said drive shafts, a swiveling first bevel gear (21) supported rigidly on said first spindle for rotation therewith and a driving second bevel gear (25) rotatably mounted on said first spindle, each of said bevel gears being driven by a different one of said drive shafts, a second spindle (15) driven by said second bevel gear (25) and a tool carrier driven by said second spindle, wherein the improvement comprises a bearing bracket (19) supported on said first bevel wheel (21), said second spindle (15) rotatably mounted in said bearing bracket (19), a bevel gear (20) secured on said second spindle for rotation therewith, said bearing bracket (19) includes a plate (23) with said second spindle (15) extending through said plate (23), a tool carrier (16) spaced outwardly from said plate (23), said front end portion of said housing spaced from said plate (23) on the opposite side thereof from said tool carrier (16), bearing means (13,14) for said first spindle being located in said side wall portion adjacent said front end portion of said housing, said first bevel gear (21) and said bearing bracket (19) extend out of said front end portion of said housing, said plate (23) is spaced outwardly from said front end portion of said housing and a free space is located between said front end portion of said housing and said plate, and a flexible housing laterally surrounding the free space between said plate (23) and the front end portion of said housing with said flexible housing comprising a bellows (34) secured at one end to said plate and at the other end to said side wall portion between said rear end portion and said first spindle.

15. A swivel head as set forth in claim 14, wherein said second spindle (15) extends through said plate (23), a reduction gear (27-40) extending between said second spindle and said tool carrier (16), said reduction gear having a high reduction ratio and including a tool carrier shaft (31) connected to said tool carrier (16).

16. A swivel head for industrial robots, which swivel head has two degrees of freedom, comprising a rigid housing (1,2,3) having a rear end portion, a front end portion, and a side wall portion extending between said rear end portion and said front end portion, drive shafts (4,5) supported in and extending axially through said rear end portion toward said front end portion and one being guided concentrically around the other, a rotatable first spindle (2) supported in said housing and extending perpendicularly of said drive shafts, a swiveling first bevel gear (21) supported rigidly on said first spindle for rotation therewith and a driving second bevel gear (25) rotatably mounted on said first spindle, each of said bevel gears being driven by a different one of said drive shafts, a second spindle (15) driven by said second bevel gear (25) and a tool carrier driven by said second spindle, wherein the improvement comprises a bearing bracket (19) supported on said first bevel wheel (21), said second spindle (15) rotatably mounted in said bearing bracket (19), a bevel gear (20) secured on said second spindle for rotation therewith, said bearing bracket (19) includes a plate (23) with said second spindle (15) extending through said plate (23), a tool carrier (16) spaced outwardly from said plate (23), a tool carrier (16) connected to the end of said second spindle (15) located on the opposite side of said plate (23) from said housing, a reduction gear (27-40) interconnecting said second spindle (15) and said tool carrier (16), and said reduction gear includes a tool carrier shaft (31) connected to said tool carrier (16).

17. A swivel head, as set forth in claim 15, wherein said reduction gear is a planetary gearing and includes a pinion (27) formed on the end of said second spindle (15), a flange-like attachment (30) spaced axially outwardly from said pinion (27), bearing means (40,42) located in said attachment (30), planet pinion shafts (37,38,39) located in said bearing means (40,42) and extending therefrom toward said plate (23), planet pinions (28,29,36) positioned on said planet pinion shafts spaced from said attachment (30) and said planet pinions (28,29,36) disposed in meshed engagement with said pinion (27), a bearing carrier (33) laterally encircling said reduction gear, a ring gear (41) formed on the inside of said bearing carrier (33) and said planet pinions (28,29,36) in meshed engagement with said ring gear (41).

18. A swivel head, as set forth in claim 16, wherein said reduction gear is a planetary gearing and includes a pinion (27) formed on the end of said second spindle (15), a flange-like attachment (30) spaced axially outwardly from said pinion (27), bearing means (40,42) located in said attachment (30), planet pinion shafts (37,38,39) located in said bearing means (40,42) and extending therefrom toward said plate (23), planet pinions (28,29,36) positioned on said planet pinion shafts spaced from said attachment (30) and said planet pinions (28,29,36) disposed in meshed engagement with said pinion (27), a bearing carrier (33) laterally encircling said reduction gear, a ring gear (41) formed on the inside of said bearing carrier (33) and said planet pinions (28,29,36) in meshed engagement with said ring gear (41).

19. A swivel head, as set forth in claim 17, wherein a gear (46) is secured on the end of said tool carrier shaft (31) spaced axially from said tool carrier (16), and said planet pinions (28,29,36) disposed in meshed engagement with said gear (46).

20. A swivel head, as set forth in claim 18, wherein a gear (46) is secured on the end of said tool carrier shaft (31) spaced axially from said tool carrier (16), and said planet pinions (28,29,36) disposed in meshed engagement with said gear (46).

21. A swivel head, as set forth in claim 15, wherein said reduction gear (27-40) includes an annular bearing carrier (33) located between said plate (23) and said tool carrier (16), bearing means (32) supported on said bearing carrier (33) for said tool carrier shaft (31), bearing means (17) in said plate (23) for said second spindle (15) with said bearing means (32) and bearing means (17) being in coaxial alignment.

22. A swivel head, as set forth in claim 16, wherein said reduction gear (27-40) includes an annular bearing carrier (33) located between said plate (23) and said tool carrier (16), bearing means (32) supported on said bearing carrier (33) for said tool carrier shaft (31), bearing means (17) in said plate (23) for said second spindle (15) with said bearing means (32) and bearing means (17) being in coaxial alignment.

* * * * *